United States Patent [19]

Seymour

[11] 4,052,188
[45] Oct. 4, 1977

[54] PRESS BENDING FIXTURE WITH IMPROVED ADJUSTING MEANS

[75] Inventor: Samuel L. Seymour, Oakmont, Pa.

[73] Assignee: PPG Industries, Inc., Pittsburgh, Pa.

[21] Appl. No.: 745,909

[22] Filed: Nov. 29, 1976

[51] Int. Cl.² .................................... C03B 23/02
[52] U.S. Cl. ..................................... 65/273; 65/106; 65/275; 65/289
[58] Field of Search ................ 65/104, 106, 273, 275, 65/289

[56] References Cited

U.S. PATENT DOCUMENTS

| | | | |
|---|---|---|---|
| 3,367,764 | 2/1968 | Seymour | 65/291 |
| 3,531,276 | 9/1970 | Richardson | 65/287 |
| 3,819,351 | 6/1974 | Shaffer et al. | 65/273 |
| 3,846,105 | 11/1974 | Petrella et al. | 65/106 |

Primary Examiner—Arthur D. Kellogg
Attorney, Agent, or Firm—Dennis G. Millman

[57] ABSTRACT

In an apparatus for press bending heat-softened glass sheets of the type which includes a flexible shaping plate and means to adjust the curvature of the shaping plate, adjustability is facilitated by providing a segmented rigid plate behind the flexible shaping plate.

4 Claims, 2 Drawing Figures

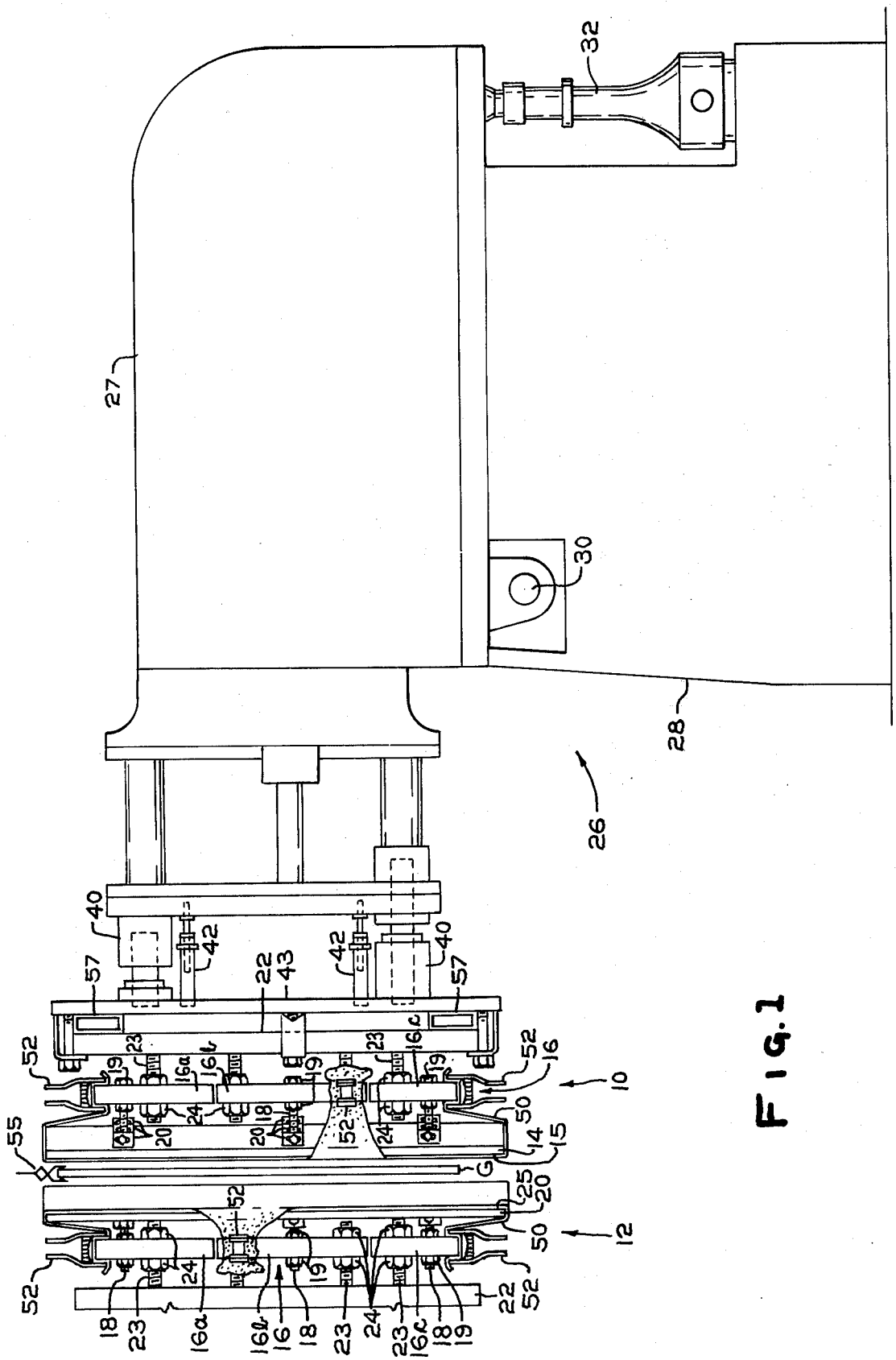

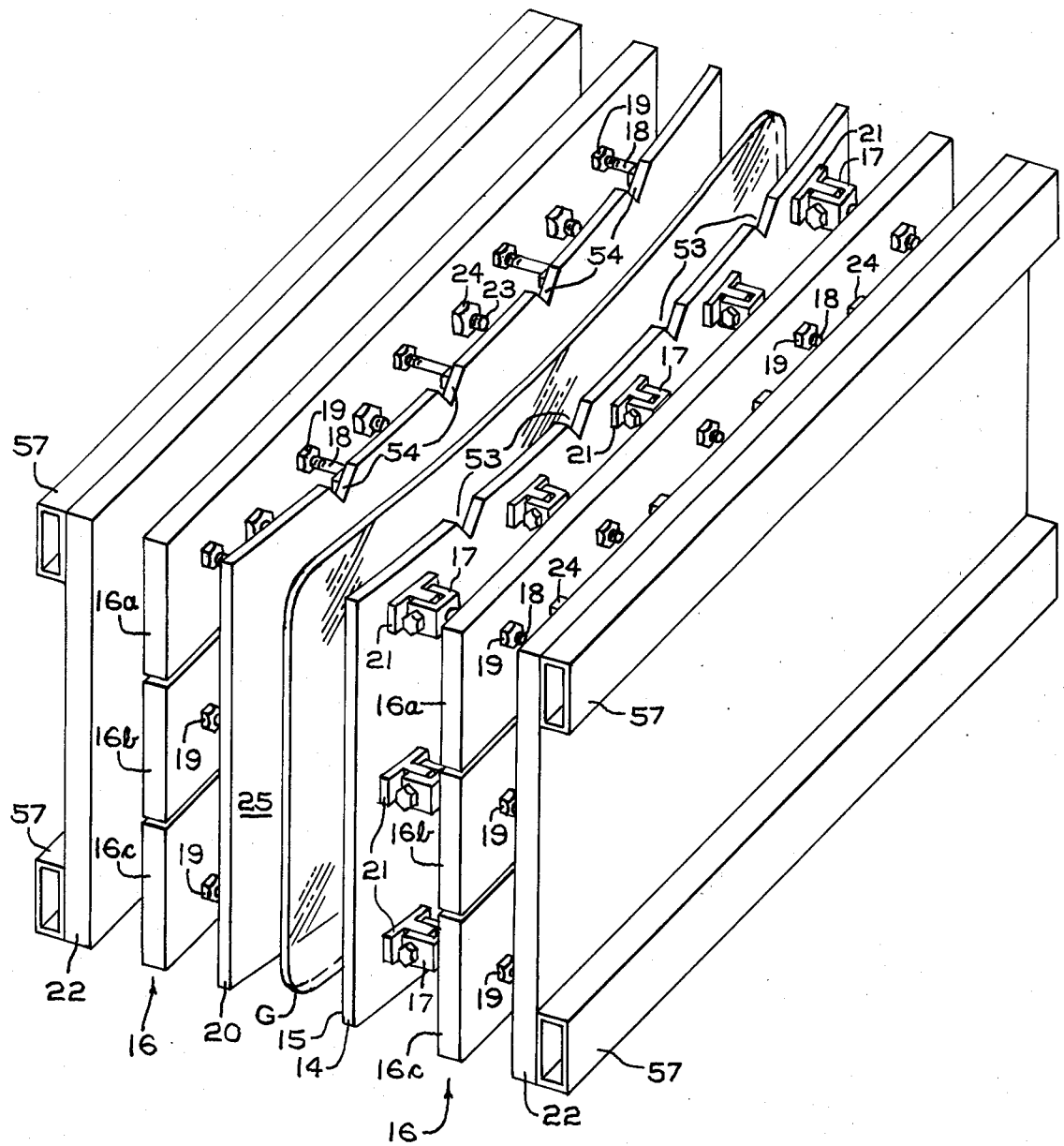

PRESS BENDING FIXTURE WITH IMPROVED ADJUSTING MEANS

BACKGROUND OF THE INVENTION

This invention relates to the shaping of heat-softened glass sheets or the like by pressing the sheets between two rigid pressing members of complementary curvature. This techique, known as press bending, lends itself to relatively inexpensive mass production of bent glass sheets within precise tolerances.

A particularly advantageous press bending apparatus is disclosed in U.S. Pat. No. 3,367,764 to S. L. Seymour. A feature of that apparatus is the provision of a relatively felxible shaping plate adjustably affixed to a relatively rigid plate, so as to enable adjustments to the curvature of the shaping plate to be made simply and quickly. Adjustments are made possible by the use of a large number of threaded rods and nuts to attach the shaping plate to the rigid plate. By turning the nuts, the distance between a portion of the shaping plate and the rigid plate can be changed. While such an arrangement possesses many advanages, it would be desirable to reduce the time required to carry out the many adjustments needed to conform the curvature of the shaping plate to a given standard.

SUMMARY OF THE INVENTION

It has now been found that a flexible shaping plate can be more quickly and accurately adjusted by affixing the shaping plate to a rigid adjusting plate made up of a plurality of segments. Each segment of the adjusting plate carries a pluality of adjustable connectors which join the segment with a portion of the shaping plate. Each adjusting plate segment, in turn, is adjustably mounted onto a rigid back plate. Thus, small, localized changes in the shaping plate curvature may be made by adjusting the distance between points on the shaping plate and the adjusting plate by means of individual connectors, while major adjustment involving an entire zone of the shaping plate as a whole are carried out by reorienting one or more of the adjusting plate sections. By this arrangement, an overall curvature correction can be effected without disturbing each individual adjusting connector. For example, in a case where it is desired to slightly flatten the curvature of a compound curve in one direction only, the provision of sectionalized adjusting plates permits the adjusment to be carried out without disrupting the curvature in the other direction. The adjusting plate segments, although relatively rigid, can be flexed to some degree, which provides a second advantageous mode of adjustment. By slightly flexing one of the adjusting plate segments, the over-all curvature of one region of the shaping plate can be smoothly altered without disrupting the curvature of the remainder of the shaping plate.

THE DRAWINGS

FIG. 1 is a fragmentary end view of a typical vertical press bending operation incorporating the improved shaping members of the present invention.

FIG. 2 is a perspective view of a pair of shaping members including a sectionalized adjusting plate.

DETAILED DESCRIPTION

The glass bending apparatus shown in the drawings, with the exception of te adjusting plate, is substantially identical to that shown in the aforementioned U.S. Pat. No. 3,367,764 to Seymour. The details of the construction and operation of such an apparatus can be obtained from that patent, the disclosure of which is hereby incorporated by reference. Therefore, only a brief outline of that disclosure need be set forth here in order to understand the present invention.

As shown in FIGS. 1 and 2, the bending apparatus comprises a concave shaping member 10 and a convex shaping member 12. The concave shaping member 10 is comprised of a relatively flexible shaping plate 14 having a concave shaping surface 15. Disposed behind the shaping plate 14 is a relatively rigid adjusting plate 16 in three rigid segments 16a, 16b, and 16c. The provision of three rigid segments as shown has been found to be particularly advantageous, but there need be only two or as many as four or more, as dictated by the size and curve complexity of the shape being produced. Although there is not specific upper limit to the number of segments, larger numbers increase the amount of aligning required and thereby diminish the benefits obtained. The segments of the adjusting plate in the drawings have adjacent edges that extend along horizontal lines, but a vertical demarcation or some other configuration may be desirable in other cases. Adjustable connections between shaping plate 14 and adjusting plate 16 are provided by a large number of threaded shafts 18 (only a representative number are shown in the drawings for the sake of clarity) attached to adjusting plate 16 with nuts 19 and to shaping plate 14 by means of clevises 17 and T-shaped members 21. By manipulating nuts 19, the distance between each portion of shaping plate 14 and rigid adjusting plate 16 can be varied, thereby changing the curvature of shaping surface 15. Each of the rigid adjusting plate segments is, in turn, adjustably fastened to a flat, rigid back plate 22 by means of a plurality of threaded rods 23 and nuts 24 (again, only a representative number are shown). The connections between the shaping plate and the adjusting plate generally outnumber the connections between the adjusting plate and the back plate by a wide margin.

The convex member 12 comprises a relatively flexible shaping plate 20 having a shaping suface 25 complementary to that of the concave shaping surface 15. The convex shaping member includes a rigid, segmented adjusting plate 16, a rigid back plate 22, and adjustable attachment means corresponding to those of the concave shaping member 10, as indicated by like numerals in the drawings.

Reciprocating motion is imparted to both the concave and convex shaping members 10 and 12 by a ram mechanism 26 engaging the back side of each shaping member (only one of which is shown in FIG. 1). Each ram mechanism includes a housing 27 which may be driven along a generally horizontal line on a stationary base 28. Slight angularity may be imparted to the reciprocation of the ram by means of a pivot 30 and a piston 32. Interposed between the ram housing 27 and the respective shaping member are impact absorbing means 40 and 41 and return springs 42. Each back plate 22 is removably clamped onto a frame member 43 on the ram mechanism.

Each shaping member is provided with a cover 50 in a direct contact with shaping surfaces 15 and 25. The cover 50 is preferably of a material which does not harm glass at elevated temperatures. Preferably, the material for the cover is a stretchcable fiber glass cloth composed of texturized yarn of the type depicted in U.S. Pat. No. 3,148,968 to Cypher and Velchar. A number of closely spaced clamps 52 grip the periphery of adjusting plate 16 to clamp the cover 50 in place. Portions of cover 50 are shown broken away in FIG. 1 to reveal details of the plate connecting means, and in FIG. 2 the cover 50 has not been shown at all.

Shaping plate 14 has a series of notched portions 53 along its upper edge and shaping plate 20 has corresponding notched portions 54 aligned with the notched portions 53. A sheet of heat-softened glass G suspended on a series of tongs 55 is conveyed into position between the parted shaping members. The shaping members are then pressed together to bend the glass to the curvature of the complementary shaping surfaces. The tongs 55 are received in the notched portions 53 and 54 when the shaping members are brought together to engage the opposite surfaces of the glass sheet to bend the latter. When the shaping members separate again, the bent sheet of glass is conveyed away from the bending station by the tongs.

It should be understood that the shaping member 20 depicted in FIGS. 1 and 2 are adapted for being provided with compound bends, but that for the sake of clarity the drawings shown a cylindrical section bend, that is, a curve in one direction only. It should also be apparent that the present invention is not limited to the vertical mode of press bending but can also be applied to bending operations where the sheets of glass are held in a generally horizontal orientation or even at an oblique orientation.

The terms "flexible" and "rigid" used herein to describe the plates which form the shaping members are, of course, relative terms and are intended merely to connote the stiffness of one plate relative to the stiffness of the other plates. In a typical glass bending apparatus ¼ inch (6.35 millimeters) thick hot rolled steel, for example, may be considered flexible in comparions with ½ inch (12.7 millimeters) thick cold rolled No. 1018 carbon steel, which in turn may be considered rigid. Extra rigidity may be imparted to back plate 22 by providing the latter with reinforcing braces such as tubular members 57. The "flexible" shaping plates 14 and 20 are considerably more rigid than the heat-softened glass sheets that are shaped by engagement therebetween. Hence, the flexible shaping plates resist deformation and maintain their adjusted shape when engaging a glass sheet to shape the latter.

The sectionalized adjusting plate of the present invention improves the ease with which adjustments may be made to the shaping surface. For example, after establishing a desired compound curvature on shaping surfaces 15 and 25 in preparation for a new production run by meticulously adjusting the large number of connector rods 18 by turning nuts 19, initial runs may show a need to change the radius of curvature in one direction while maintaining the radius of curvature in the other direction unchanged. Previously, such an adjustment entailed resetting a large number of the rods 18, which led to the necessity of re-establishing the curvature in both directions even though a change in only one direction was desired. This not only consumed greater amounts of time but increased the likelihood that additional inaccuracies would be introduced. With the shaping members shown in the drawings, the vertical radius can be changed by altering the spacing of individual adjusting plate segments 16a, 16b, or 16c with respect to back plate 22. This is accomplished by turning nuts 24 on connector rods 23. When one adjusting plate segment is thus relocated, the effect is to displace a large number of shaping plate connecting rods 18 en masse along with the portion of the shaping plate associated therewith. Because the individual connecting rods 18 are not adjusted, the localized curvature within that portion of the shaping plate is not disturbed and need not be realigned for curvature inthe horizontal direction. This is an illustration of just one specific situation in which the advantages of the present invention are realized. Other situations will occur any time it is desired to reorient a substantial area of the shaping surface as a unit.

Another situation in which the present invention may be utilized to expedite and improve adjustments occurs when it is desired to alter the curvature along only one edge of a shaping plate. In the specific arrangement of FIGS. 1 and 2, a slight adjustment to the horizontal radius of curvature may be needed, for example, along the top edge only. This may be accomplished by imparting a slight bow to the upper adjusting plate segment 16a by manipulating some of the nuts 24 which are located near the sides of segment 16a. Since the shaping plate connectors 18 are not changed, the adjustment is imparted to the shaping plate without disturbing the smoothness of curvature previously established and with fewer adjustments than if the more numerous nuts 19 had been manipulated. Furthermore, since the adjusting plate segment 16a is separate from the other segments, the curvature adjustment is isolated from the lower and middle regions where no adjustment was needed.

Many variations in glass press bending arrangements are known to those of skill in the art, and it will be apparent that the present invention may be adapted to a wide variety of embodiments without departing from the spirit of the invention as defined in the following claims.

I claim:

1. An apparatus for bending a heat-softened glass sheet by sandwiching said glass sheet in pressurized engagement between glass facing surfaces of a pair of glass shaping members having complementary shaping surfaces conforming substantially to the shape desired for the bent glass and relatively movable between a retracted position and a glass engaging position, each glass shaping member comprising:
   a relatively flexible shaping plate having a major surface whose shape and areal extent approximates that of the shape and areal extent desired for the glass sheet after bending and having sufficient rigidity to resist deformation during pressurized engagement against a heat-softened glass sheet;
   adjusting plate means including at least two relatively rigid plate segments which together occupy an area substantially coextensive with that of said shaping plate and are located in spaced relation behind and in facing relation to said shaping plate;
   a relatively rigid back plate having an area substantially coextensive with that of said shaping plate and located in spaced relation behind and in facing relation to said adjusting plate segments;
   a plurality of first connecting members fastened to each of said adjusting plate segments and to said relatively flexible shaping plate, each of said first connecting members including individual means for adjusting the distance between said shaping plate and the respective adjusting plate segment to thereby alter the shape of said shaping plate;

a plurality of second connecting members fastened to each of said adjusting plate segments and to said relatively rigid back plate, each of said second connecting members including individual means for adjusting the distance between the respective adjusting plate segment and said back plate.

2. The apparatus of claim 1 wherein said relatively flexible shaping plate has a compound curvature.

3. The apparatus of claim 2 wherein said adjusting plate means includes at least three segments.

4. The apparatus of claim 3 wherein said segments abut along parallel lines which extend transversely across the width of the shaping member.

* * * * *